United States Patent [19]
Huang et al.

[11] Patent Number: 5,390,261
[45] Date of Patent: Feb. 14, 1995

[54] METHOD AND APPARATUS FOR PATTERN CLASSIFICATION USING DISTRIBUTED ADAPTIVE FUZZY WINDOWS

[76] Inventors: Yee-Wei Huang, 2006 Anderson Ave.; Willard W. Olson, 1852 Anderson Ave.. #1, both of Manhattan, Kans. 66502

[21] Appl. No.: 699,321

[22] Filed: May 13, 1991

[51] Int. Cl.⁶ .............................. G06K 9/00
[52] U.S. Cl. ........................ 382/14; 382/36; 395/3; 395/21
[58] Field of Search ............ 382/14, 15, 30, 33, 382/34, 36; 395/3, 21, 23, 24

[56] References Cited
U.S. PATENT DOCUMENTS 5,222,155  6/1993  Delanoy et al. ............. 382/34

OTHER PUBLICATIONS

"A Fuzzy Neuron And Its Application To Pattern Recognition", T. Yamakawa & S. Tomoda, *3rd IFSA Congress*, Seattle, Wash., Aug. 6–11, 1989, pp. 30–38.
"Patent Abstracts of Japan", Publication Number JP2310782, Dec. 26, 1990.

*Primary Examiner*—Leo H. Boudreau
*Attorney, Agent, or Firm*—Thorpe, North & Western

[57] ABSTRACT

A method for pattern classification and, in particular, a method which distributes the classification criteria across a neural network. The classification criteria for a pattern class is stored distributively in the neural network in two aspects. First, it manifests itself as one or more levels of templates, each of which represents a fuzzily unique perspective of the pattern class. Second, the template at each level is represented by a set of fuzzy windows, each of which defines a classification criterion of a corresponding feature of the pattern class.

13 Claims, 5 Drawing Sheets

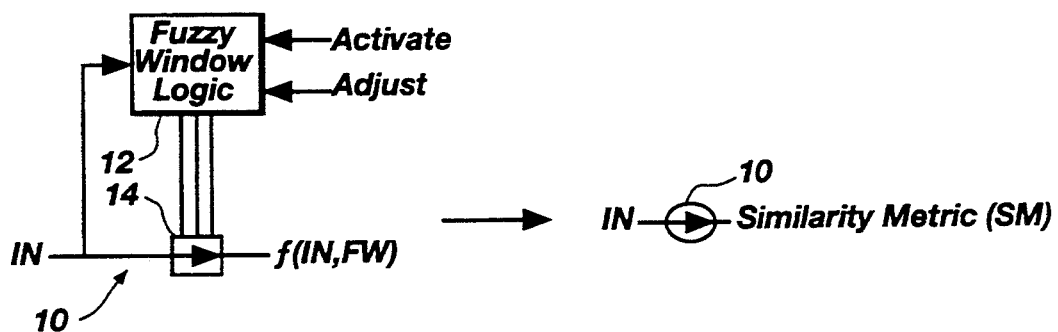
Fig. 1a
Fig. 1b
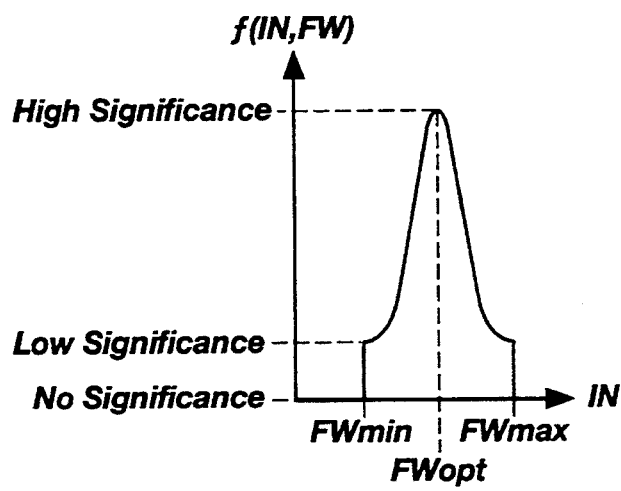
Fig. 1c
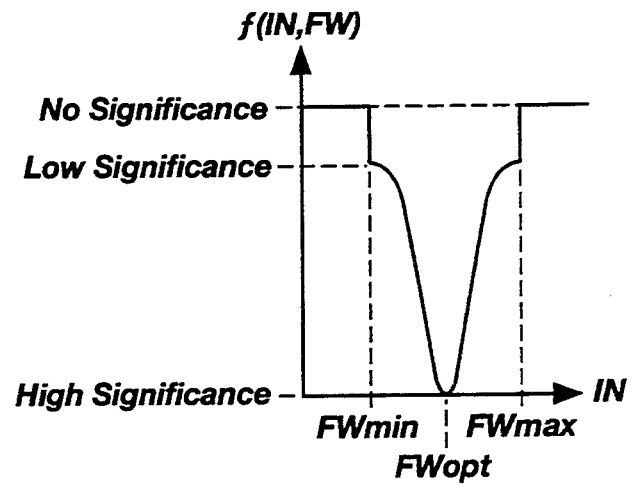
Fig. 1d

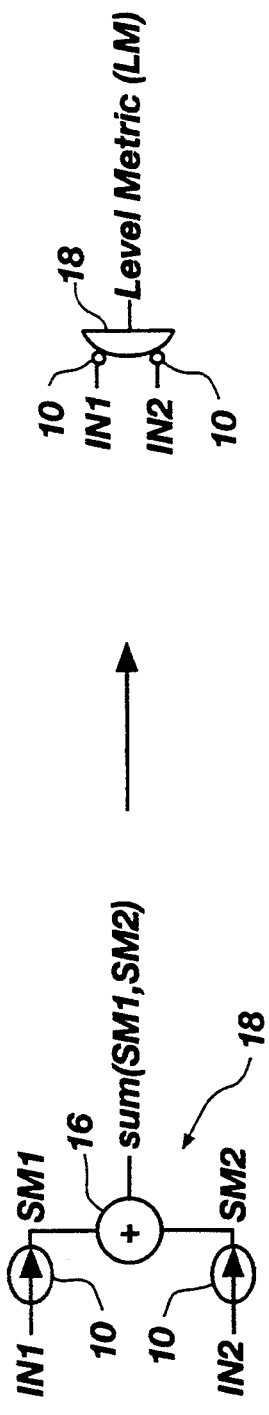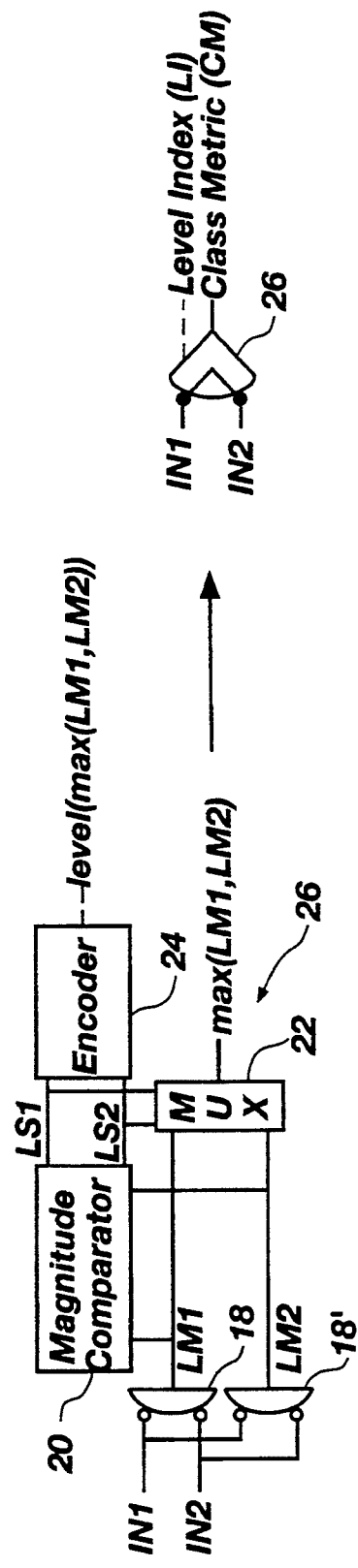

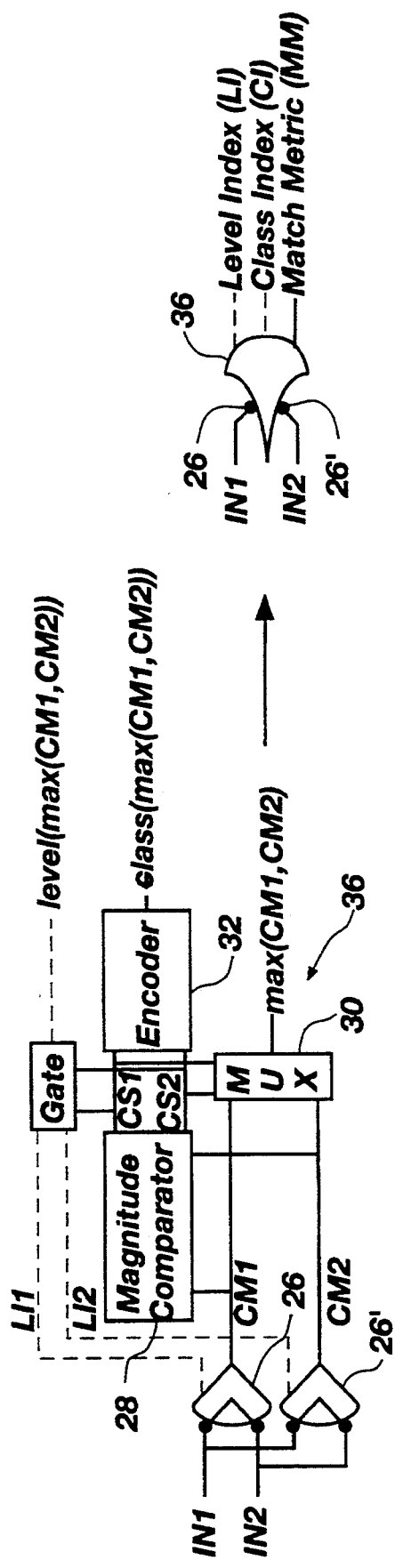
Fig. 5a
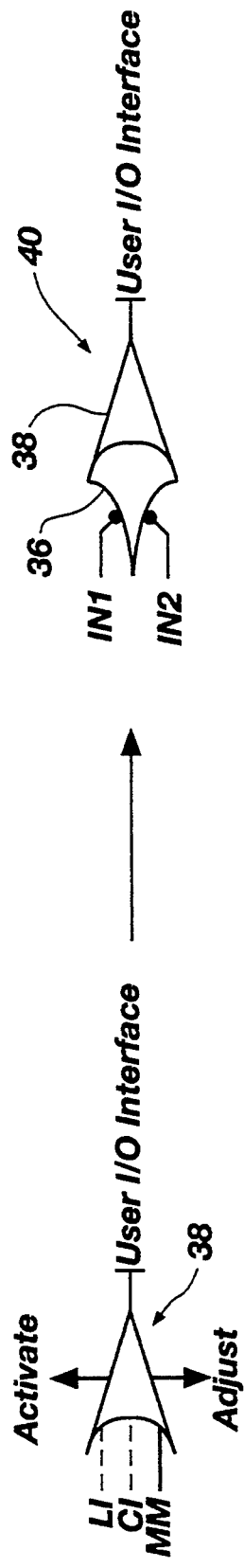
Fig. 5b
Fig. 6a
Fig. 6b

METHOD AND APPARATUS FOR PATTERN CLASSIFICATION USING DISTRIBUTED ADAPTIVE FUZZY WINDOWS

TECHNICAL FIELD

This invention relates generally to methods and apparatus for pattern classification, and, in particular, to pattern classification methods and apparatus which distribute the classification criteria across an artificial neural network.

BACKGROUND ART

It has been proposed for many years that certain functions of the nervous systems of animals could be emulated, at least in part, using electronic circuitry. Many of the most influential papers in this area are collected in *Neurocomputing*, edited by Anderson and Rosenfeld and published by the MIT Press, Cambridge, Mass., 1988. In recent years, considerable progress has been achieved in this area of research. One of the most promising areas of this investigation has been in the area of artificial neurons arranged in regular networks, typically referred to as neural networks. Representative examples of useful networks of such neurons are shown in U.S. Pat. Nos. 4,660,166 and 4,719,591. In general, each input or afferent "synapse" of each artificial neuron in these networks implements a characteristic linear or non-linear transfer function between a corresponding input stimulus and the summing node of the neuron. In the most general form, the transfer function parameters of these synapses are selectively variable. An example of one such "programmable" synapse is shown in U.S. Pat. No. 4,782,460.

It is generally accepted that synapses are the smallest macroscopic working elements in a nervous system. This implies that the function of a neural network is intrinsically dictated by the synaptic behavior. One of the most widely accepted, and biologically accurate, description of synaptic behavior was given by Donald Hebb in *The Organization of Behavior* (1949). According to the "Hebbian" learning rule, "when an axion [sic] of cell A is near enough to excite a cell B and repeatedly or persistently takes part in firing it, some growth process or metabolic change takes place in one or both cells such that A's efficiency, as one of the cells firing B, is increased".

Although various types of transfer functions have been proposed for use in neural networks to model Hebbian synaptic behavior, such transfer functions typically relate a set of input/output pairs according to a plurality of "weighting factors". In this type of neural networks, a set of equations, i.e., a model, can be derived in terms of weighting factors for a network of a fixed topology. The procedure for determining the values of these factors is similar to the procedure for determining the values of the parameters of a statistical model. However, several problems exist in neural networks which employ such weighting factors. The most significant one is the lack of capability for incremental "learning" or adaptation of the weighting factors. As in the procedure for determining the values of the parameters of a given statistical model, all data, new as well as old, must be considered, essentially in a batch process, to recalculate the weighting factors. Thus, during the "learning" phase, the network cannot perform normal functions. Another major problem arises when the Hebbian learning rule is implemented by adopting the concept of "weight" and applied to such networks. Typically, application of the rule causes the weighting factors to increase monotonically, so that a persistent input pattern will tend to eventually overwhelm the network. If this were true in the biological system, we would all become so hypersensitive to persistent stimuli from such common items as clothes, eyeglasses, and background noises that we would go insane! Other problems include the uncertainty and generally slow rate of convergence of the weighting factors with respect to a set of input/output pairs. Such problems render neural networks based on the concept of weighting factors not only unsupported in biology, but also limited in practical utility.

SUMMARY OF THE INVENTION

It is, therefore, an objective of the present invention to provide a method and apparatus for pattern classification, and, in particular, a method and apparatus which distributes the classification criteria across an artificial network. In accordance with the present invention, the classification criteria for a pattern class is stored distributively in the neural network in two aspects. First, it manifests itself as one or more levels of templates, each of which represents a fuzzily unique perspective of the pattern class. Second, the template at each level is represented by a set of fuzzy windows, each of which defines a classification criterion of a corresponding feature of the pattern class.

Another objective of the present invention is to provide an artificial neural network adapted to produce a "match metric" which indicates the degree of similarity between a new input pattern and a pattern stored distributively in the neural network in the form of a plurality of fuzzy windows. In accordance with the invention, these fuzzy windows are arranged in "quantum levels", and the network searches through some or all of the levels to find the best match metric for the input pattern. In a preferred form, the match metric is essentially calculated as a sum of similarity metrics, each of which signifies the degree of similarity between a feature of the input pattern and the corresponding feature of the pattern stored at a certain quantum level. For each feature, the similarity metric has a value varying from a maximum when the input value of this feature equals the optimum value of the fuzzy window to a minimum when the input value is outside the fuzzy window.

One other objective of the present invention is to provide a novel transfer function to model the synaptic behavior of a biological neural network, and an artificial neural network adapted to implement this transfer function in a plurality of artificial synapse fragments or "synapsettes".

These and other objectives and advantages of the present invention are achieved in a method and apparatus for selectively classifying each of a plurality of input patterns, each comprising at least first and second input values corresponding respectively to first and second features, into a respective one of a plurality of pattern classes, each characterized by at least first and second feature classification criteria for assessing the first and second features, respectively. For each of the plurality of classes, the first and second feature classification criteria are first defined in accordance with the present invention as respective first and second "fuzzy windows", each of the fuzzy windows having a maximum value, a minimum value, and an optimum value. For each of the plurality of classes, it is then determined if the first input value of the input pattern is within the first fuzzy window of the class. If so, a first similarity metric is provided having a value which varies from a predetermined high—significance value when the first input value corresponds to the optimum value of the first fuzzy window of the class to a predetermined low—significance value when the first input value corresponds to either the maximum or minimum value of the first fuzzy window of the class. If not, the first similarity metric is provided having a predetermined no—significance value. It is then determined if the second input value of the input pattern is within the second fuzzy window of the class. If so, a second similarity metric is provided having a value which varies from the high—significance value when the second input value corresponds to the optimum value of the second fuzzy window of the class to the low—significance value when the second input value corresponds to either the maximum or minimum value of the second fuzzy window of the class. If not, the second similarity metric is provided having the no—significance value. A level metric is then provided as a function of the first and second similarity metrics. Finally, the level metrics for each of the classes are compared, and a class metric is provided indicative of the one of the classes having the most significant level metric.

In accordance with one aspect of the present invention, an artificial synapse fragment or "synapsette" is adapted to receive an input and to provide an output, the significance of which is related to the input according to a predetermined fuzzy window transfer function.

In accordance with another aspect of the present invention, an artificial neuron comprises a first synapsette adapted to receive a first input and to provide a first metric, the significance of which is related to the first input according to a first predetermined fuzzy window transfer function, a second synapsette adapted to receive a second input and to provide a second metric, the significance of which is related to the second input according to a second predetermined fuzzy window transfer function, and an artificial neurode adapted to receive the first and second metrics and to provide an output corresponding to the combined significance of the first and second metrics.

In accordance with yet another aspect of the present invention, an artificial neural network comprises a first artificial neuron adapted to receive a set of inputs and to provide a first metric, the significance of which is related to the inputs according to a first set of predetermined fuzzy window transfer functions, a second artificial neuron adapted to receive the set of inputs and to provide a second metric, the significance of which is related to the inputs according to a second set of predetermined fuzzy window transfer functions, an artificial reticular brain stem adapted to receive the first and second metrics and to provide an output related to the most significant of the first and second metrics, and an artificial thalamus to effectuate incremental adaptation.

BRIEF SUMMARY OF THE DRAWINGS

FIG. 1a illustrates schematically an artificial synapse fragment or "Synapsette" constructed in accordance with the present invention.

FIG. 1b illustrates symbolically the Synapsette of FIG. 1a.

FIG. 1c illustrates graphically one preferred fuzzy window transfer function.

FIG. 1d illustrates graphically one other preferred fuzzy window transfer function.

FIG. 3a illustrates schematically an artificial Neurode constructed in accordance with the present invention, including a pair of afferent Synapsettes.

FIG. 3b illustrates symbolically the Neurode of FIG. 3a, including the pair of afferent Synapsettes.

FIG. 4a illustrates schematically an artificial Neuron constructed in accordance with the present invention, including a pair of afferent Neurodes.

FIG. 4b illustrates symbolically the Neuron of FIG. 4a, including the pair of afferent Neurodes.

FIG. 5a illustrates schematically an artificial Reticular Brain Stem constructed in accordance with the present invention, including a pair of afferent Neurons.

FIG. 5b illustrates symbolically the Reticular Brain Stem of FIG. 5a, including the pair of afferent Neurons.

FIG. 6a illustrates schematically an artificial Thalamus constructed in accordance with the present invention.

FIG. 6b illustrates symbolically a complete, artificial Quantum Neural Network constructed in accordance with the present invention, including a pair of afferent Neurons, a Reticular Brain Stem, and a Thalamus.

FIG. 7 illustrates diagrammatically the logic flow of the Thalamus of FIG. 6a.

DESCRIPTION OF THE INVENTION

Systemic Overview

Figure 2:
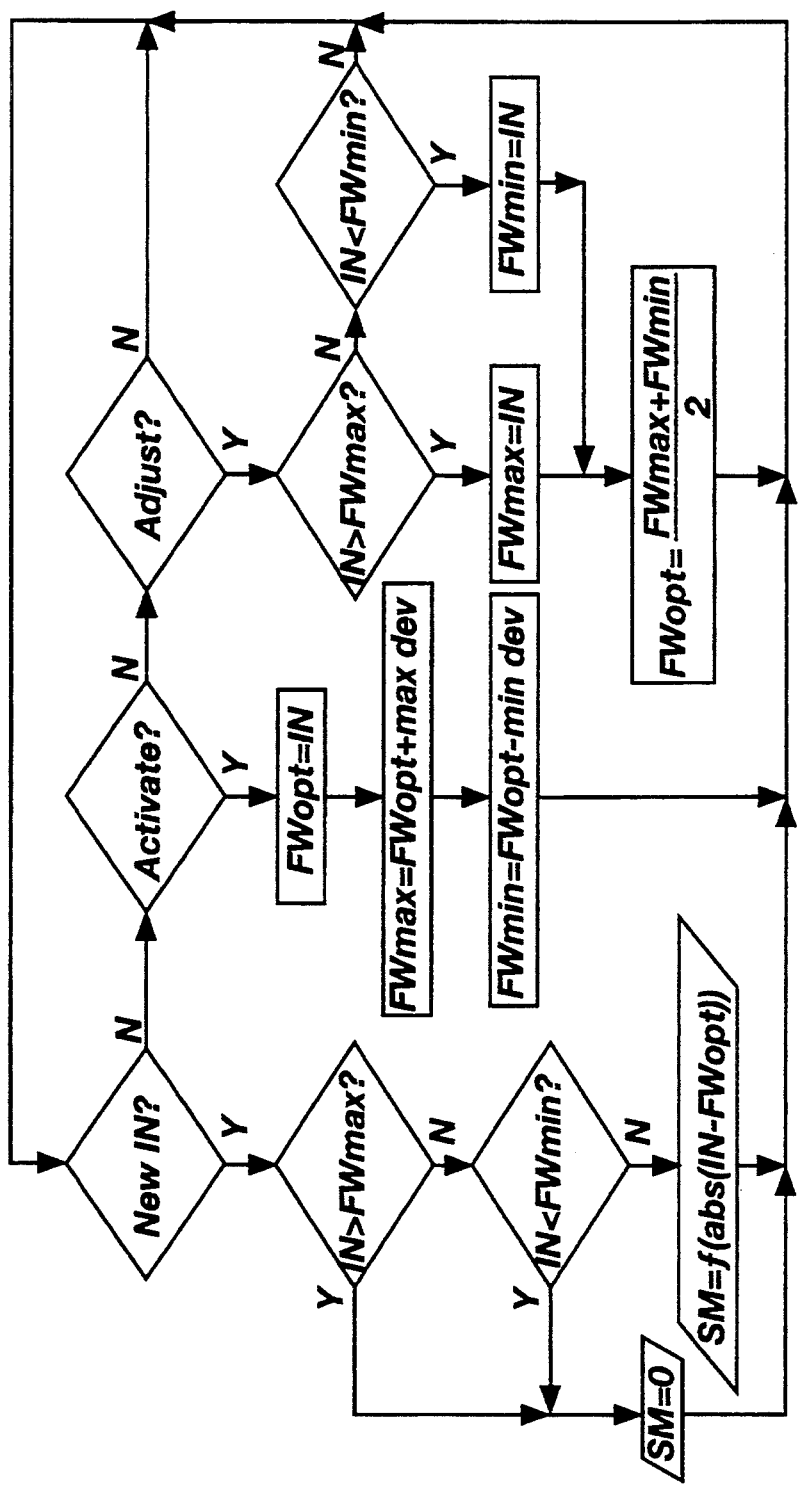
FIG. 2 illustrates diagrammatically the logic flow of the Synapsette of FIGS. 1a and 1b.

The present invention provides a method and apparatus for classifying patterns represented by one or more electrical input values, either analog or digital. In particular, the preferred method and apparatus distributes the classification criteria across an artificial neural network implemented in either software or hardware or a combination of both. In each form, the information representing a pattern class is stored distributively in two aspects. First, it is manifested as one or more levels of templates, each of which represents a fuzzily unique perspective of the pattern class. Second, the template at each level is represented by a set of "fuzzy windows", each of which defines a classification criterion of a corresponding "feature" of the pattern class. In contrast to conventional weighting factors, each fuzzy window relates an input value to an output value according to a special fuzzy window transfer function. In applications wherein sets of input values must be considered together to discern a particular pattern., each of the input values is transferred to a related output value according to a respective fuzzy window. We think of the set of fuzzy windows responsible for detecting a single pattern perspective as existing at a "quantum level". If it is desired to simultaneously search through several unique perspectives of a given pattern class, an additional quantum level of this class must be "activated" for each such perspective.

In typical applications, each input pattern is composed of at least a first and a second value corresponding respectively to first and second features of the input pattern. Each feature of the input pattern is assigned a classification value which is determined with respect to a respective one of the fuzzy window transfer functions existing at a given quantum level. In general, each transfer function is characterized by a maximum value, a minimum value, and an optimum value. In the preferred form, the transfer function is similar to a classic "bell" curve, with the output value or "similarity metric" being assigned a predetermined no_significance value if the input value is either above the maximum value or below the minimum value of the fuzzy window. If the input value is within the fuzzy window, however, the similarity metric will vary from a predetermined high_significance value, when the input value corresponds to the optimum value of the fuzzy window, to a predetermined low_significance value, when the input value corresponds to either the maximum or minimum value of the fuzzy window.

Combining the several similarity metrics produces a "level metric" which indicates the degree of similarity between the input pattern and the perspective of the pattern class stored distributively in the set of fuzzy windows existing at a quantum level. If there are multiple active quantum levels, each having a unique perspective of the same pattern class, the several level metrics can be compared to determine the most significant one. The resulting "class metric" quantitatively represents the "best" match of the input pattern to the several perspectives of the pattern class, and, together with a "level index", indicates which of the levels, i.e., perspectives, is best matched.

Using this modular scheme, that is, adding quantum levels to represent new perspectives within the same class, additional classes can be accommodated simply by activating a new set of quantum levels and the associated level comparison logic. In such a system, each of the several class metrics can be compared to determine the one having the highest significance. The resulting "match metric" quantitatively represents the "best" match of the input pattern to all of the quantum levels of all of the pattern classes, and, together with a "class index", indicates which of the classes is best matched. A hierarchical pattern classification method and apparatus constructed in accordance with the present invention thus consists of a plurality of fuzzy window transfer functions arranged into sets of quantum levels associated into one or more classes, and means for selecting, both within each class as well as between all classes, the one quantum level that best matches a given input pattern. The specific methods and apparatus for establishing, and, as appropriate, incrementally adjusting the information distributed throughout such a system will be discussed in detail below.

Theoretical Basis of the Model

In the preferred embodiment, an analogy has been drawn between the functionality of biological neural networks and the apparatus most appropriate for implementing the pattern classification method of the present invention. In particular, we have found it to be quite convenient to consider the fuzzy window transfer function as an analog of the behavior of a synapse in the sense that an input "stimulus" is chemically transferred from the afferent (incoming) axon of the "sending" neuron across the synaptic cleft to a dendritic spine of the "receiving" neuron and, depending upon the chemical and physical "resonance" of the spine, causes depolarization across the cell membrane of the receiving neuron in proportion to how closely the input stimulus is attuned to the resonance of the spine. As expected, the spine tends to respond most strongly when the input stimulus precisely matches the resonance of the spine, with the response decreasing rapidly the more the stimulus is mismatched until there is no significant response.

We have found it to be very useful, however, to think of the biological synapse as having the unusual ability to respond to distinctly different input stimuli in unique, yet significant ways. For example, imagine a receiving neuron that has only two spines, each of which is adapted to respond strongly to one stimulus and less strongly to another stimulus, but neither spine responds quite so strongly individually as to effect a significant output from the neuron. In other words, each of the spines is adapted to respond on at least two distinctly different "biological levels". In such an arrangement, the neuron will respond with a significant output in at most four situations: (Situation 1) if the first spine responds strongly to its input stimulus and the second spine responds weakly to its stimulus; (Situation 2) if the first spine responds weakly to its stimulus but the second responds strongly to its stimulus; (Situation 3) if both spines respond strongly to the stimuli; and (Situation 4) if both spines respond weakly to the stimuli (assuming, of course, that the combined effect of the weak responses is sufficient to effect a significant neuron output). Since, in general, the combined responses of the spines in each of these situations will be quantitatively different, it is possible to uniquely distinguish each of these different situations by carefully examining the resultant output response of the neuron.

With this in mind, we suggest that the response characteristics of the set of available biological synapses associated with a single neuron can be modeled effectively by constructing sets of artificial synapse fragments or "synapsettes" which cooperate to effect a significant neuron output. Applying this analogy to the two spine arrangement discussed immediately above, Situation 1 can be modeled by a first pair of synapsettes existing at a first quantum level, with the optimum value of the transfer function of the first of these synapsettes corresponding to the input stimulus which produces the strong response in the first spine and the optimum value of the transfer function of the second of these synapsettes corresponding to the input stimulus which produces the weak response in the second spine. Situation 2 can be modeled by a second pair of synapsettes existing at a second quantum level, with the optimum value of the transfer function of the first of these synapsettes corresponding to the input stimulus which produces the weak response in the first spine and the optimum value of the transfer function of the second of these synapsettes corresponding to the input stimulus which produces the strong response in the second spine. Situation 3, in turn, can be modeled by a third pair of synapsettes existing at a third quantum level, with the optimum value of the transfer function of the first of these synapsettes corresponding to the input stimulus which produces the strong response in the first spine and the optimum value of the transfer function of the second of these synapsettes corresponding to the input stimulus which produces the strong response in the second spine. Finally, Situation 4 can be modeled by a fourth pair of synapsettes existing at a fourth quantum level, with the optimum value of the transfer function of the first of these synapsettes corresponding to the input stimulus which produces the weak response in the first spine and the optimum value of the transfer function of the second of these synapsettes corresponding to the input stimulus which produces the weak response in the second spine. Considered collectively, therefore, the first synapsettes of the four pairs of synapsettes represent the first spine (or, considered more broadly, synapse), while the second synapsettes of the four pairs of synapsettes represent the second spine or synapse.

In general, each time that a given spine/synapse cooperates with other spines/synapses to effect a significant output from the biological neuron, an additional artificial synapsette must be activated in the model. Each such effective combination of synapsettes exist at a unique quantum level. Thus, even though in the example arrangement each of the two spines/synapses respond on only two biologically significant levels to effect four distinct, significant neuron outputs, the artificial system requires eight synapsettes (2 synapses×4 effective combinations) to effectively model the biological system. On the other hand, the artificial system requires no additional resources to model the situation where the cumulative response of the spines/synapses is insufficient to effect a significant output from the neuron.

Continuing now with the analogy, we have found it to be convenient to consider groups of such artificial synapsettes which cooperate to effectuate significant neuronal activity, together with appropriate neuron-like logic, as comprising artificial neurons. In the biological system, the effects of synaptic activity on the output of the neuron are essentially integrative over time and space (i.e., within the confines of the cell). Thus, any particular output produced by the neuron (assuming one is produced at all) is a function of the unique sequence, location and strength of the synaptic activity occurring in the recent past. On the other hand, the biological system appears to implement time delays quite effectively, so that analysis of sequences of related input stimuli distributed over time, such as speech utterances, converges to the point where recognition is possible in intelligible elements, e.g., words, concepts, etc. Modeling this time domain aspect is somewhat problematical, and, depending upon the application, may require a hierarchy of layers of artificial neurons. Fortunately, in many real systems, we believe that time can be adequately modeled by assuming that, at least at some identifiable time and place in the biological system, the partially "recognized" bits and pieces of a pattern converge to a single neuron and result in a single significant output. This can be modeled, we suggest, by a series of samples, each presented over time to a corresponding artificial synapse (i.e., related set of synapsettes) of the artificial system, with the responses of the synapsettes existing in each quantum level being accumulated until the last sample has been considered. In such an artificial system, the neuron logic must periodically examine the cumulative response of each quantum level, and effect an output which is related to the most significant of these responses.

Although the issue is still open for debate, we believe it is clear that some form of recognition does occur in the reticular brain stem of all chordates. By recognition, we are referring to the ability of such biological systems to process sensory information, detect multiple possible patterns present in such information, and, as more complete information becomes available over time, allow certain pattern responses to predominate over others. Consider two examples, a primitive one and a sophisticated one. In the first example, a lower chordate is ambling along and perceives a creature approaching. It seems though that the visual information is ambiguous—the creature could be either a friend or a foe. At some point in time, however, assuming continued closure of the two creatures, one pattern suddenly predominates over the other, the other creature becomes clearly recognized and an appropriate response is immediately triggered. In the second example, a young student is paying close attention as her English teacher writes on the blackboard. The teacher draws what could be a lower case "c", but then continues the stroke upward to form a closed loop. At this point in time, the letter clearly cannot be a "c" but, on the other hand, could still be a lower case "a" or "d" or "g" or "q" or even an "o". In both examples, a predominating effect occurs over time. Once again, modeling this time domain aspect is problematical. In many real systems, however, events occur that can serve to break the flow of time into useful intervals. For example, the completion of a handwritten character or a spoken word can be determined with sufficient precision to segment time into manageable intervals. By logical extension, therefore, the logic responsible for periodically considering the relative dominance of competing artificial neurons can be considered as implementing a reticular brain stem function.

For purposes of the present invention, the highest function of the biological system which is modeled corresponds approximately to the interaction of the thalamus (or its precursor structure in primitive chordates) and the reticular brain stem to effect learning or adaptation. In general, how such adaptation is actually effected in biological systems is irrelevant—adaptation undoubtedly does occur and something or—things effect such adaptation. As a matter of convenience, we have chosen to refer to the logic in our model which allows the user of the artificial system to define the rules under which incremental learning or adaptation of that system will occur, and which effects such learning or adaptation in accordance with such rules, as an artificial "thalamus". A preferred form for this artificial thalamus will be discussed in detail below.

The Preferred Embodiment

Shown schematically in FIG. 1a and symbolically in FIG. 1b is an artificial synapse fragment or "Synapsette" 10 comprised of Fuzzy Window Logic 12 and Transfer Function Logic 14. In general, the Fuzzy Window Logic 12 is adapted to define a "fuzzy window" (FW) between a fuzzy window minimum value (FWmin) and a fuzzy window maximum value (FWmax), and usually, but not necessarily, centered on a fuzzy window optimum value (FWopt). The Transfer Function Logic 14 is adapted to receive an input value (IN) and provide an output value the significance of which is a function, f, of IN and the parameters of the FW. We refer to this output value as a "Similarity_Metric" (SM). In the preferred form, SM varies from a value indicating maximum significance when IN coincides with FWopt to a value indicating minimum significance when IN is outside the FW.

In the example fuzzy window transfer functions shown in FIGS. 1c and 1d, SM will be equal to a predetermined No_Significance value whenever IN is below FWmin or above FWmax. When IN is greater than or equal to FWmin and less than or equal to FWmax, SM will vary from a predetermined Low_Significance value when IN is equal to either FWmin or FWmax, to a predetermined High_Significance value when IN is equal to FWopt. Care must be exercised when assigning the actual values of No_Significance, Low_Significance, and High_Significance to assure that, for the maximum number of Synapsettes 10 in a single quantum level, the greatest possible sum of the SM's does not saturate or overflow the numerical capabilities of the downstream logic, as discussed further below.

In the preferred method of operation, as shown in the logic flow diagram of FIG. 2, Fuzzy Window Logic 12, upon detecting a new input value, IN, cooperates with the Transfer Function Logic 14 to first determine if IN is greater than FWmax or less than FWmin and, if so, to assign an SM of No_Significance (signified in FIG. 2 as a "0"), but otherwise to assign an SM according to the selected fuzzy window transfer function, such as in FIGS. 1c or 1d (signified in FIG. 2 as a function, f, of the absolute value of the difference between IN and FWopt). In response to an "Activate" signal, Fuzzy Window Logic 12 "activates" the operation of the Transfer Function Logic 14 by first (re)defining FWopt as IN, and then (re)biasing FWmax and FWmin relative to the new FWopt by predetermined FWmax deviation (max_dev) and FWmin deviation (min_dev) values, respectively. In response to an "Adjust" signal, Fuzzy Window Logic 12 "adjusts" the operating parameters of the Transfer Function Logic 14 to include the new IN within the FW, by first redefining either FWmin, if IN is less than the current FWmin, or FWmax, if IN is greater than the current FWmax; and then recomputes FWopt as the average of FWmax and FWmin. If desired, some additional, small bias value may be used to offset FWmax or FWmin from IN in order to provide a region of recognition around IN.

In most real applications, patterns to be recognized consist of more than one feature. In such applications, the artificial system of the present invention will use a different Synapsette 10 to recognize each such feature. For example, if the pattern consists of two features, two Synapsettes 10 and 10', each responsive to a respective one of two input values, IN1 and IN2, can be combined, as shown schematically in FIG. 3a and symbolically in FIG. 3b, with Summing Logic 16 which provides an output value corresponding to the combined significance of the outputs, SM1 and SM2, of Synapsettes 10 and 10', respectively. We refer, collectively, to the set of afferent Synapsettes 10 and 10' existing at the same quantum level and the Summing Logic 16 as a "Neurode" 18, and to the output value provided by the Neurode 18 as a "Level_Metric" (LM). In general, LM represents quantitatively the degree of similarity between the input values and the respective set of fuzzy windows. Intuitively, LM can also be thought of as a measure of the similarity of the perspective of the pattern embodied in the fuzzy windows of Synapsettes 10 and 10' to the corresponding features of the input pattern embodied in the input values, IN1 and IN2.

If the application is such that the pattern being sought has more than one perspective, the artificial system of the present invention will use a different Neurode 18 for each perspective, with each Neurode 18 being configured with a Synapsette 10 for each feature of the corresponding perspective. For example, if it is desired to seek matches for two perspectives, each comprising two features, the artificial system can be configured, as shown schematically in FIG. 4a and symbolically in FIG. 4b, with two afferent Neurodes 18 and 18', each of which has two afferent Synapsettes (not labeled). Recall that, in such a configuration, the system resembles a biological neuron having two synapses each of which responds on two distinct quantum levels. However, as in the biological neuron, the artificial system must also be able to discriminate among the possible quantum level responses and provide an output related to only the most significant one. In the preferred form, a Magnitude Comparator 20 compares the Level_Metrics, LM1 and LM2, and asserts a corresponding Level_Select signal, LS1 or LS2, depending on which is more significant. A Multiplexor (MUX) 22 responds to the assertion of either LS1 or LS2 by providing the corresponding Level_Metric, LM1 or LM2, respectively. An Encoder 24 provides an encoded form of the asserted Level_Select signal, LS1 or LS2, as a "Level_Index" (LI). We refer, collectively, to the set of afferent Neurodes 18 and 18', the Magnitude Comparator 20, the MUX 22 and the Encoder 24 as a "Neuron" 26, and to the LM provided by the MUX 22 as a "Class_Metric" (CM). In general, CM represents quantitatively the degree of similarity between the set of input values and the most similar set of fuzzy windows. Intuitively, CM can also be thought of as a measure of the similarity of the most similar of the perspectives embodied in the Neurodes 18 and 18' to the input pattern embodied in the input values, IN1 and IN2. Assuming that each of the Neurodes 18-18' afferent to the same Neuron 26 is seeking perspectives of the same basic pattern, e.g., tone or cadence variations of the spoken word "I", then LI indicates which of the perspectives is best matched by the input pattern, and CM indicates how well the input pattern matches that particular perspective.

If the application is such that more than one pattern is being sought, the artificial system of the present invention will use a different Neuron 26 for each pattern, with each Neuron 26 being configured with a Neurode 18 for each perspective of the corresponding pattern. For example, if it is desired to seek matches for two patterns, each comprising two perspectives, the artificial system can be configured, as shown schematically in FIG. 5a and symbolically in FIG. 5b, with two afferent Neurons 26 and 26', each of which has two afferent Neurodes (not labeled). Recall that, in such a configuration, the system resembles a biological reticular brain stem having two neurons, each of which responds to two different patterns. However, as in the biological reticular brain stem, the artificial system must also be able to discriminate among the possible neuron responses and provide an output related to only the most significant, or dominant, one. In the preferred form, a Magnitude Comparator 28 compares the Class_Metrics, CM1 and CM2, and asserts a corresponding Class_Select signal, CS1 or CS2, depending on which is more significant. A Multiplexor (MUX) 30 responds to the assertion of either CS1 or CS2 by providing the corresponding Class_Metric, CM1 or CM2, respectively. An Encoder 32 provides an encoded form of the asserted Class_Select signal, CS1 or CS2, as a "Class_Index" (CI), while a Gate 34 simply passes either LI1 or LI2 depending on whether CS1 or CS2, respectively, is asserted. We refer, collectively, to the set of afferent Neurons 26 and 26', the Magnitude Comparator 28, the MUX 30, the Encoder 32 and the Gate 34 as a "Reticular Brain Stem" (RBS) 36, and to the CM provided by the MUX 30 as a "Match_Metric" (MM). In general, MM represents quantitatively the degree of similarity between the set of input values and the most similar set of fuzzy windows. Intuitively, MM can also be thought of as a measure of the similarity of the most similar of all of the perspectives of all of the patterns embodied in the Neurons 26 and 26' to the input pattern embodied in the input values, IN1 and IN2. Assuming that each of the Neurons 26-26' afferent to the RBS 36 is seeking perspectives of different basic patterns, e.g., variations of the handwritten characters "a" and "o", respectively, then LI indicates the particular perspective that is best matched by the input pattern, CI indicates the particular pattern to which the best matched perspective belongs, and MM indicates how well the input pattern matches that particular perspective of that particular pattern.

In certain applications, it may be necessary to search for perspectives of only a single pattern class. Since a single Neuron 26 can accommodate all of the perspectives of a single pattern class, there is thus no need for the dominance function provided by the RBS 36. In such a system, the LI provided by that Neuron 26 will suffice to uniquely indicate which perspective was best matched, while the CM will indicate the goodness of that match.

It may be desirable in some applications to incrementally and gracefully adapt the fuzzy windows embodying a perspective so as to accommodate normal drift in that perspective, while preserving the capability of detecting abnormal variations. For example, the brief acceleration of the flywheel of an automobile engine due to the burning of the fuel mixture in a given cylinder will vary gradually over time due to various aging effects, some of which are relatively short term, such as spark plug fouling, and others of which are relatively long term, such as piston ring and valve wear. In contrast, cylinder misfires due to such things as improper spark timing or blocked fuel injection will immediately result in distinctly abnormal motion of the flywheel. If pollution control is a primary goal in such an application, the artificial system should be able to intelligently accommodate the gradual forms of variations but resist the abrupt changes. In the preferred form, such an "intelligent", incremental learning algorithm is embodied in a "Thalamus" 38, shown schematically in FIG. 6a. In most applications, the Thalamus 38 is used in combination with the Reticular Brain Stem 36 of FIG. 5b as shown in FIG. 6b to form what we refer to as a "Quantum Neural Network" (QNN) 40.

Figure 7:
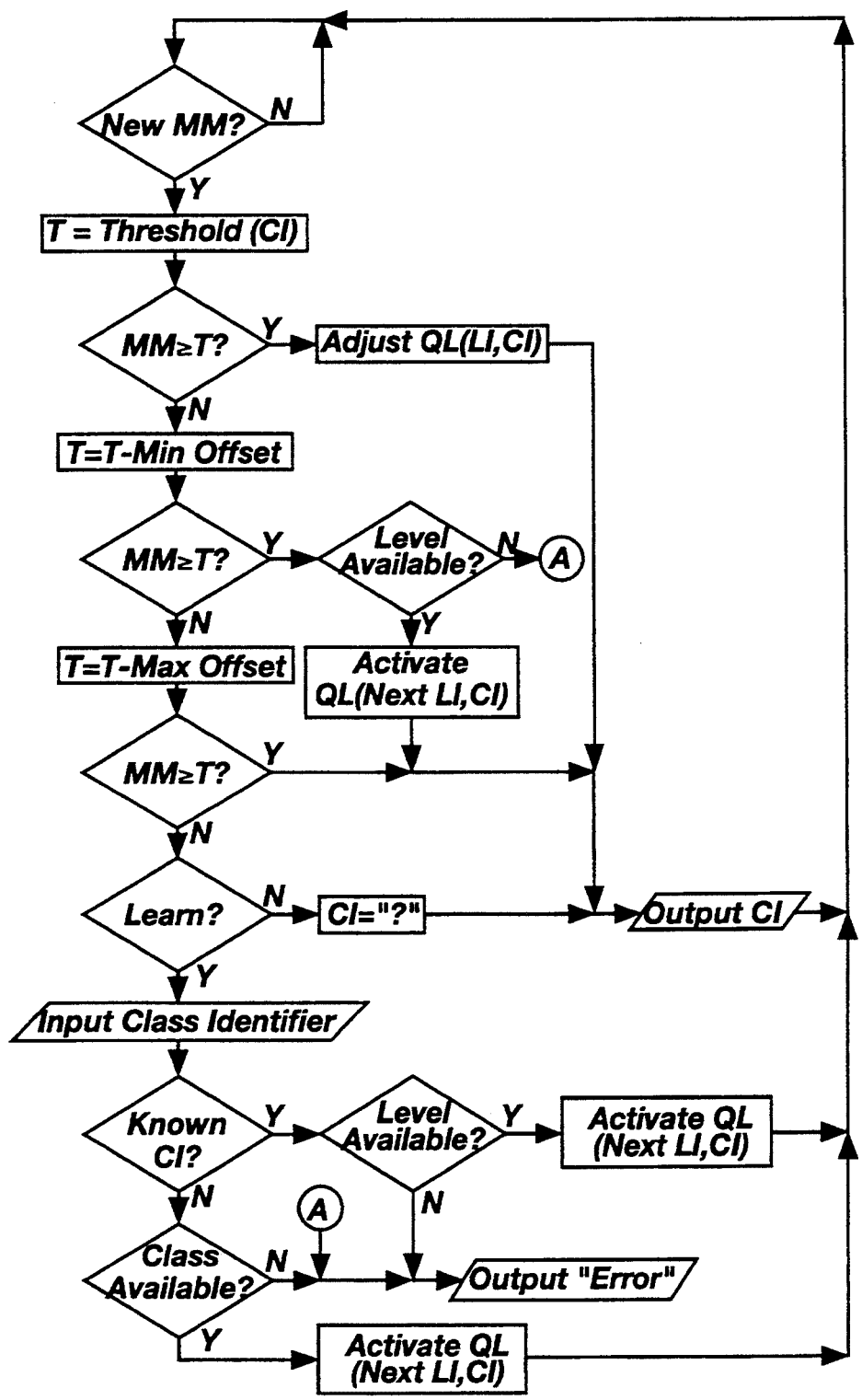

In the preferred method of operation, as shown in the logic flow diagram of FIG. 7, Thalamus 38, upon detecting a new Match_Metric, MM, accesses a table of predefined "threshold" values to select the characteristic threshold, T, for the pattern class corresponding to the Class_Index, CI, associated with MM. In general, the threshold T represents the lower limit of MM that will be considered by the QNN 40 to be a "very good" match of the input pattern to the most similar perspective/pattern. Although it may be acceptable in some applications to assign the same threshold for all classes, we have found it advantageous in other applications to have the ability to assign distinct threshold values to different classes. For example, in the engine misfire detection application discussed briefly above, all of the cylinders are essentially identical and a single threshold value for all should be sufficient. In contrast, the variability of handwritten characters is sufficiently wide that each character may need a distinct threshold to assure acceptable recognition.

In any event, if the new MM is greater than or equal to the selected T, the Thalamus 38 will assert the Adjust signal, discussed above, to enable the Synapsettes 10-10' existing at the quantum level representing the perspective LI of pattern CI to incrementally adjust their respective fuzzy windows. Thalamus 38 will then output to the user either CI per se, or, if desired, the "Clas-s_Identifier" (discussed in more detail below) corresponding to CI. If MM is less than T, the Thalamus 38 decreases T by a predefined minimum offset (Min_Offset). In general, the new T, after adjustment by Min_Offset, represents the lower limit of MM that will be considered by the QNN 40 to be a "good" match of the input pattern to the most similar perspective/pattern. Although we have found it to be generally acceptable to assign the same minimum offset for all classes, it may advantageous in some applications to have the ability to assign distinct minimum offset values to different classes. The ability of the QNN 40 to incrementally adjust the parameters of an existing quantum level is a direct manifestation of incremental learning.

In any event, if the new MM is greater than or equal to the adjusted T, the Thalamus 38 will first verify that sufficient resources, including an adequate set of Synapsettes 10-10', are available to establish a new quantum level within the class corresponding to CI, and, if insufficient resources are available, will output an "Error" signal to the user before halting the system. If adequate resources are available, Thalamus 38 will assert the Activate signal, discussed above, to enable the selected Synapsettes 10-10' to incrementally activate a new quantum level representing a new perspective (Next_LI) of pattern class CI by initializing their respective fuzzy windows. Thalamus 38 will then output to the user the CI or the corresponding Class_Identifier (see below). If MM is less than the adjusted T, the Thalamus 38 will again decrease T by a predefined maximum offset (Max_Offset). In general, the new T, after adjustment by Max_Offset, represents the lower limit of MM that will be considered by the QNN 40 to be a "fair" match of the input pattern to the most similar perspective/pattern. Although we have found it to be generally acceptable to assign the same maximum offset for all classes, it may advantageous in some applications to have the ability to assign distinct maximum offset values to different classes. The ability of the QNN 40 to incrementally activate new quantum levels within an active class is another direct manifestation of incremental learning.

In any event, if the new MM is greater than or equal to the readjusted T, the Thalamus 38 will simply output to the user the CI or the corresponding Class_Identifier (see, below). If MM is less than the readjusted T, the Thalamus 38 will determine if the user has authorized autonomous learning, and, if not, will assign a CI of "?" or some other similar indicia which, when output, will indicate that the input pattern matched no known perspective of the known pattern(s). If learning has been authorized, the Thalamus 38 will first solicit an input from the user for a Class_Identifier, and then search through all known CI's to see if one already corresponds to this Class_Identifier. If this new Class_Identifier indeed corresponds to the Class_Identifier of an existing CI, the Thalamus 38 will verify that sufficient resources, including an adequate set of Synapsettes 10-10', are available to establish a new quantum level within the class corresponding to CI, and, if insufficient resources are available, will output an "Error" signal to the user before halting the system. If adequate resources are available, Thalamus 38 will assert the Activate signal, discussed above, to enable the selected Synapsettes 10-10' to incrementally activate a new quantum level representing a new perspective (Next_LI) of the existing CI by initializing their respective fuzzy windows. If the new Class_Identifier is different from all known Class_Identifiers, the Thalamus will verify that sufficient resources, including an adequate set of Synapsettes 10-10' and a Neuron 26, are available to establish a new class, and, if insufficient resources are available, will output an "Error" signal to the user before halting the system. If adequate resources are available, Thalamus 38 will assert the Activate signal, discussed above, to enable the selected Synapsettes 10-10' to incrementally activate a new quantum level representing a new perspective (Next_LI) of the new pattern class (Next_CI) by initializing their respective fuzzy windows. The Thalamus 38 will also enable the selected Neuron 26 to initiate operation for the new CI, and associate with that new CI the Class_Identifier provided by the user. The ability of the QNN 40 to incrementally activate new classes is yet another direct manifestation of incremental learning.

Rather than simply providing a Error signal if insufficient resources are available to activate new quantum levels within a particular class, the QNN 40 may selectively reallocate some of the existing resources. For example, the quantum level within that class which has been least recently used or contains the oldest perspective may be reassigned to the new perspective. Alternatively, the QNN 40 may selectively generalize the existing resources. For example, the quantum level of that class which has the perspective most similar to the new perspective may be generalized to recognize both, or the two most similar quantum levels of that class may be generalized into one and the other reassigned to the new perspective. Of course, selective "forgetting" can also be provided if desired by allowing the user to selectively clear or otherwise deactivate specific quantum levels or classes. All such generalization and forgetting techniques are also direct manifestations of the incremental learning ability of the present invention.

As is true for other models of biological neural networks, the QNN 40 can be implemented in hardware, software, or a combination of both. In general, higher levels of performance can be expected from an embodiment having more of the functionality implemented in hardware. However, greater flexibility can be expected from an embodiment having more of the functionality implemented in software. In adapting the preferred method and apparatus of the present invention to specific, real applications, we recommend that the initial system configuration be primarily in software, with such relatively straightforward, repetitive elements as the Transfer Function Logic 14, the Neurode 18, the Neuron 26, and the RBS 36, being optionally implemented in hardware. Later, after confidence has been gained in the organization and operation of the QNN 40, more of the functionality may be migrated into hardware if the increase in performance is warranted in view of the expense. In many applications, however, some or all of the functionality can be satisfactorily performed exclusively in software. In any event, we intend the appended claims to cover all such embodiments, including all variations and modifications thereof whether discussed herein or not, which fall within the true spirit and scope of the present invention.

What we claim is:

1. A method for selectively classifying at least one input pattern into a respective one of a plurality of pattern classes, each input pattern being characterized by at least first and second input values represented by respective first and second electrical input signals having magnitudes that correspond to first and second features of the respective input pattern, each pattern class being characterized by at least first and second feature classification criteria represented by respective electrical feature classification signals having magnitudes that correspond to first and second features of the respective pattern class, comprising the steps of:

A) defining, for each of said plurality of pattern classes, said first and second feature classification criteria as respective first and second fuzzy windows, each of said windows having respectively a maximum, a minimum and an optimum electrical feature classification signal value;

B) for each of said plurality of pattern classes:
 1) determining if the first input value of said input pattern is within the first fuzzy window of said pattern class; and,
  a) if so, providing a first similarity metric signal having a value which varies from a predetermined high significance value when the first input value corresponds to the optimum feature classification signal value of the first fuzzy window of said pattern class to a predetermined low significance signal value when the first input value corresponds to either the maximum or minimum feature classification signal value of the first fuzzy window of said pattern class; but
  b) if not, assigning the first similarity metric signal a predetermined no significance value,
 2) determining if the second input value of said input pattern is within the second fuzzy window of said pattern class, and
  a) if so, providing a second similarity metric signal value having a value which varies from a predetermined high significance value when the second input value corresponds to the optimum feature classification signal value of the second fuzzy window of said pattern class to a low significance value when the second input value corresponds to either the maximum or minimum feature classification signal value of the second fuzzy window of said pattern class; but
  b) if not, assigning the second similarity metric signal a predetermined no significance value, C) generating level metric signals in response to the similarity metric signals produced by the input values and the respective fuzzy windows of each pattern class;

D) comparing the level metric signals for each of said pattern classes; and

E) generating a class index signal indicative of the one of said pattern classes which has the most significant level metric signal.

2. The method of claim 1 further comprising the steps of generating a class metric signal corresponding to said most significant level metric signal.

3. The method of claim 2 further comprising the steps of:

A) establishing, for each of said plurality of classes, an electrical threshold signal having a magnitude which defines a class threshold; and B) for the class corresponding to said class metric signal:
 1) comparing the class metric signal to the threshold signal;

2) generating a match indicator signal only if the class metric signal equals or exceeds the threshold signal; and 3) generating a no match indicator signal if the class metric signal is less than the threshold signal.

4. The method of claim 1 further comprising the steps of selectively establishing a new class having new first and second feature classification criteria dependent upon said first and second input values, respectively, of a selected one of said input patterns, further comprising the steps of:

a) establishing a new first feature classification criteria as a new first fuzzy window having a new optimum feature classification signal value corresponding to the first input value of said selected one of said input patterns, a new maximum feature classification signal value dependent upon the sum of said first input value and a predetermined fuzzy window maximum displacement signal, and a new minimum feature classification signal value dependent upon the difference between said first input value and a predetermined fuzzy window minimum displacement signal value; and b) establishing a new second feature classification criteria as a new second fuzzy window having a new optimum feature classification signal value corresponding to the second input value of said selected one of said input patterns, a new maximum feature classification signal value dependent upon the sum of the second input value of said selected one of said input patterns and a predetermined fuzzy window maximum displacement signal value, and a new minimum feature classification signal value dependent upon the difference between said second input value and a predetermined fuzzy window minimum displacement signal value.

5. The method of claim 1 further comprising the steps of selectively adjusting the feature classification signal values of the class corresponding to said class index signal, comprising the steps of:

a) adjusting the feature classification signal values associated with the first fuzzy window of said class to include said first input value; and b) adjusting the feature classification signal values associated with the second fuzzy window of said class to include said second input value.

6. The method of claim 5 wherein each of said adjusting steps comprises the steps of:

a) if said input value is greater than the maximum feature classification signal value of the fuzzy window:

1) setting the maximum feature classification signal value of said fuzzy window equal to said input value; and 2) setting the optimum feature classification signal value equal to the average of the last mentioned maximum classification signal value and the minimum classification signal value of said fuzzy window; or b) if said input value is less than the maximum feature classification signal value of the fuzzy window:

1) setting the minimum feature classification signal value of said fuzzy window equal to said input value; and 2) setting the optimum feature classification signal value of said fuzzy window equal to the average of the last mentioned minimum signal value and the maximum classification signal value of said fuzzy window.

7. A method for selectively classifying each of a plurality of input patterns into a respective one of a plurality of pattern classes, each input pattern being represented by at least first and second input values represented by electrical signals having respective magnitudes that characterize first and second features of said input pattern, each pattern class being characterized by a plurality of sets of first and second feature classification criteria, represented by respective electrical classification signal values, for assessing said first and second features, respectively, comprising the initial steps of:

for each of said plurality of pattern classes:
  for each of said sets of classification criteria:
   establishing first and second fuzzy windows each characterized by a maximum classification signal value, a minimum classification signal value and an optimum classification signal value, said first and second fuzzy windows comprising a level of said pattern class;
 for each input pattern, the additional steps of:
  for each of said plurality of classes:
   for each of said levels:
    determining if said first input value is within the first fuzzy window of said level; and
     if said first input value is within said first fuzzy window, generating a first similarity metric signal having a value which varies from a predetermined high significance value when the first input value corresponds to said optimum classification signal value to a predetermined low significance value when the first input value corresponds to either said maximum or minimum classification signal values; but
     if said first input value is not within said first fuzzy window, generating a first similarity metric signal having a predetermined no significance value;
    determining if said second input value is within the second fuzzy window of said level; and
     if said second input value is within said second fuzzy window, generating a second similarity metric signal having a value which varies from said high significance value when the second input value corresponds to said optimum classification signal value to said low significance value when the second input corresponds to either said minimum or maximum classification signal values; but
     if said second input value is not within said second fuzzy window, generating a second similarity metric signal having said no significance value; and
    generating a level metric signal indicative of the combined significance of said first and second similarity metric signals;
   comparing the level metric signals for each of said levels; and
   generating a class index signal indicative of which class is associated with the most significant class metric signal.

8. The method of claim 7 further comprising the steps of: for each of said plurality of classes:
 for each of said levels:

generating a level index signal indicative of the one of said levels that is associated with the most significant level metric signal.

9. The method of claim 8 further comprising the steps of:

for each of said plurality of classes:
generating a match metric signal indicative of the class that is associated with the most significant class metric signal.

10. The method of claim 9 further comprising the steps of: establishing, for each of said plurality of classes, a class threshold signal; and for the class associated with said match metric signal:
comparing said match metric signal to said class threshold signal;
generating a match indicating signal only if said match metric signal equals or exceeds said class threshold signal; and
generating a no-match indicating signal if said match metric signal is less than said class threshold signal.

11. The method of claim 8 further comprising the steps of:

selectively changing the feature classification criteria of the class corresponding to said class index, comprising the steps of:
modifying the first feature classification criteria of said class by adjusting the maximum, minimum and optimum feature classification signal values of the first fuzzy window at the level corresponding to said level index to include said first input value; and
modifying the second feature classification criteria of said class by adjusting the maximum, minimum and optimum feature classification signal values of the second fuzzy window at the level corresponding to said level index to include said second input value.

12. The method of claim 11 wherein each of said modifying steps further comprises the steps of:

if said input value is greater than said maximum feature classification signal value of said fuzzy window:
modifying the maximum feature classification signal value of said fuzzy window to equal said input value; and
modifying the optimum feature classification signal value of said fuzzy window to equal the average of said modified maximum feature classification signal value and the minimum feature classification signal value of said fuzzy window; or if said input value is less than said minimum feature classification signal value of said fuzzy window:
modifying the minimum feature classification signal value of said fuzzy window to equal said input value; and
modifying the optimum feature classification signal value of said fuzzy window to the average of said modified minimum feature classification signal value and the maximum feature classification signal value of said fuzzy window.

13. The method of claim 7 further comprising the steps of:

selectively establishing a new class having new first and second feature classification criteria dependent upon the first and second input values, respectively, of a selected one of said input patterns, further comprising the steps of:
establishing a new first feature classification criteria as a new first fuzzy window at the first level, said first fuzzy window having a new optimum feature classification signal value corresponding to said first input value of the selected input pattern, a maximum feature classification signal value corresponding to the sum of said first input value and a predetermined fuzzy window maximum displacement signal, and a minimum feature classification signal value corresponding to the difference between said first input value and a predetermined fuzzy window minimum displacement signal; and
establishing a new second feature classification criteria as a new second fuzzy window at the first level, said second fuzzy window having an optimum feature classification signal value corresponding to said second input value of the selected input pattern, a maximum feature classification signal value corresponding to the sum of said second input value and said predetermined fuzzy window maximum displacement signal, and a minimum feature classification signal value corresponding to the difference between said second input value and said predetermined fuzzy window minimum displacement signal.

* * * * *